UNITED STATES PATENT OFFICE.

HANS FRIEDENTHAL, OF BERLIN-NICOLASSEE, GERMANY.

FRUIT AND VEGETABLE DUST AND PROCESS OF MAKING SAME.

1,130,588. Specification of Letters Patent. Patented Mar. 2, 1915.

No Drawing. Application filed July 30, 1913. Serial No. 782,071.

*To all whom it may concern:*

Be it known that I, Dr. HANS FRIEDENTHAL, private lecturer at the Berlin University, residing at Fr. Leopoldstrasse 4, Berlin-Nicolassee, Germany, have invented certain new and useful Improvements in Fruit and Vegetable Dust and Processes of Making Same, of which the following is a specification.

It is well known that the digestion of plants, more particularly of vegetables and fruit, is rendered more difficult owing to the presence of cellular walls inclosing the nourishing substances. If it were possible to remove or destroy the said walls the digestion and assimilation of vegetables or fruit would be greatly facilitated. This applies not only to human beings, that is convalescents and children, but also to animals. Such vegetables or fruit have also the further advantage that the labor of mastication is considerably reduced. Hitherto it was however impossible to reduce vegetables to such a fine powder. More particularly, the attempt to grind vegetables between mill stones has hitherto failed as the material became hot and consequently useless. In certain kinds of vegetables, for instance spinach, the generation of heat is such as to burn the spinach.

The process according to this invention consists in the vegetables being first dried, and then reduced to a coarse powder, which is preferably done in a crushing mill. The finest particles produced in this preliminary crushing, are then drawn off by a current of air of low velocity, and the coarse powder is ground again between mill stones, rollers or balls, until all particles are drawn off by the air current, in the form of finest powder or dust. The residue which is difficult to grind and contains the woody plant portions, is left behind and used elsewhere. The finest dust thus obtained, complies entirely with the condition prescribed by medicine, of being divided to such an extent that the weight of the single particles is one one-billionth, $\frac{1}{1,000,000,000}$, of a gram. In powder of this nature, practically all the nourishing ingredients of vegetables are assimilated by the human stomach. The powder can be taken alone or in a liquid or solid vehicle, for instance with milk and other additions.

Having now particularly described and ascertained the nature of my said invention and in what manner the same is to be performed, I declare that what I claim is:

1. A process for the manufacture of vegetable dust which consists in drying the vegetable, then grinding it to a coarse powder and finally removing and collecting the finest dust particles weighing about one one-billionth of a gram each by an air current of low velocity.

2. A process for the manufacture of fruit dust which consists in drying the fruit, then grinding it to a coarse powder and finally removing and collecting the finest dust particles weighing about one one-billionth of a gram each by an air current of low velocity.

3. A process for the manufacture of vegetable dust which consists in drying the vegetable, then grinding it to a coarse powder, removing and collecting the finest dust particles weighing about one one-billionth of a gram each by an air current, then grinding the coarse powder again and removing the dust of the same fineness by an air current until merely the woody portions are left, the velocity of the air current in each instance being so low, that it will remove only dust of the said fineness.

4. A process for the manufacture of fine fruit powder which consists in drying the fruit, then grinding it to a coarse powder, removing and collecting the finest powder particles weighing about one one-billionth of a gram each by an air current, then grinding the coarse powder again and removing the powder of the same fineness by an air current until merely the woody portions are left, the velocity of the air current in each instance being so low, that it will remove only dust of the said fineness.

5. A vegetable dust containing no woody portions, each particle of said dust weighing less than one one-billionth of a gram.

6. A fine powder of fruit containing no woody portions, each particle of said powder weighing less than one one-billionth of a gram.

In testimony whereof I affix my signature in presence of two witnesses.

DR. HANS FRIEDENTHAL.

Witnesses:
 WOLDEMAR HAUPT,
 HENRY HASPER.